Patented June 14, 1932

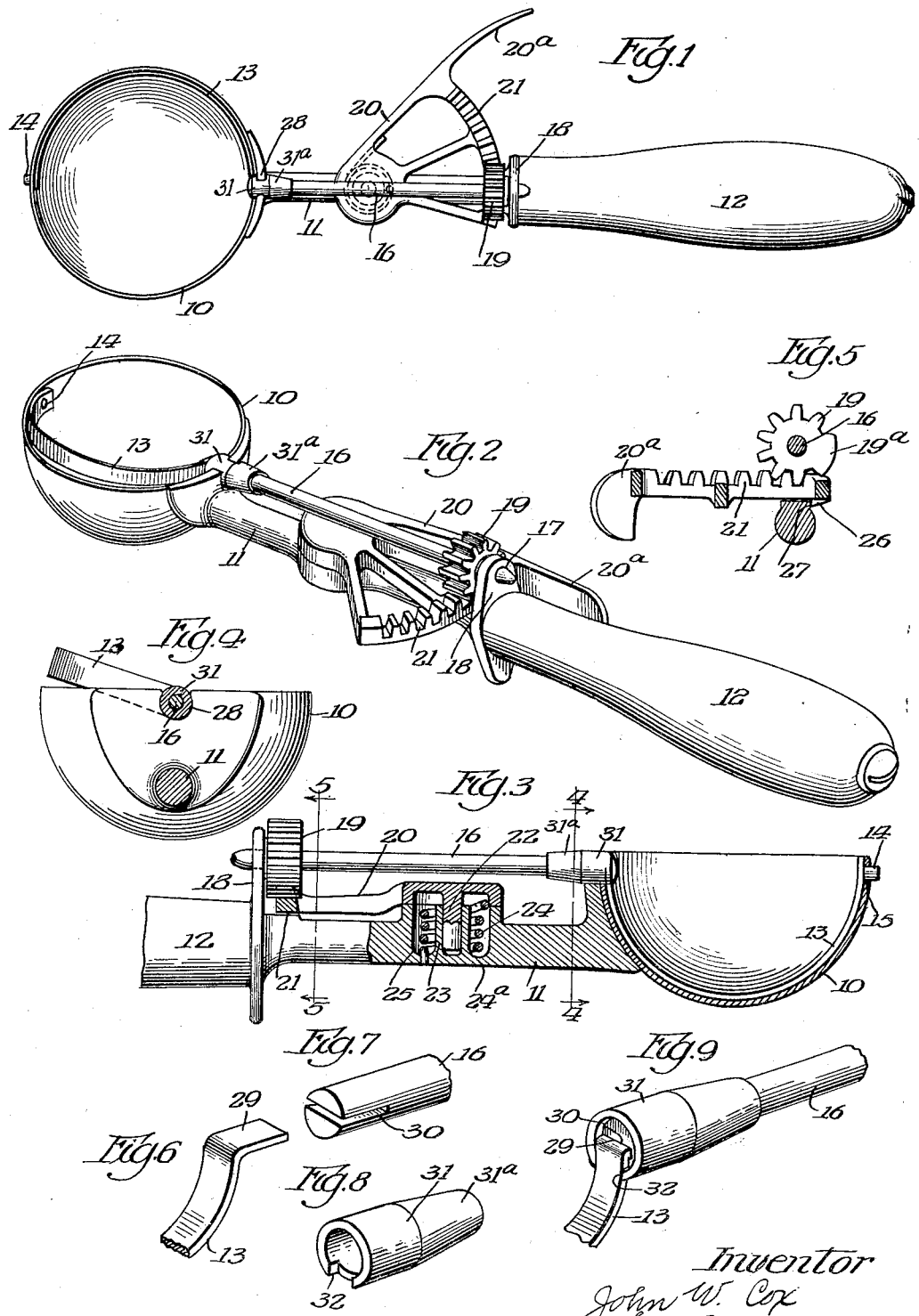

1,862,527

UNITED STATES PATENT OFFICE

JOHN W. COX, OF NEWARK, NEW JERSEY, ASSIGNOR TO THE GILCHRIST COMPANY, OF NEWARK, NEW JERSEY, A CORPORATION OF NEW JERSEY

DISHER

Application filed March 31, 1930. Serial No. 440,376.

The invention relates to dishers of the type designed more especially for serving ice-cream or similar purposes.

One object of the invention is to simplify the type of disher set forth in Patent No. 1,132,657, in which the scraper shaft is removably held in an open bearing by a spring clip, by dispensing with auxiliary means, such as a spring clip, for retaining the shaft in its operative position.

Another object of the invention is to provide a device of this type in which the manipulation of no special device, such as an adjustable stop, is necessary in removing the scraper and its shaft when it is desired to clean or repair the disher.

Other objects of the invention will appear from the detailed description.

The invention consists in the several novel features hereinafter set forth and more particularly defined by claims at the conclusion hereof.

In the drawing: Fig. 1 is a plan of a disher embodying the invention. Fig. 2 is a perspective illustrating the position of the scraper at the end of its discharging or working stroke. Fig. 3 is a longitudinal section. Fig. 4 is a section on line 4—4 of Fig. 3. Fig. 5 is a section on line 5—5 of Fig. 3. Figs. 6, 7 and 8 are details showing the scraper, shaft, and sleeve before they have been assembled. Fig. 9 is a perspective showing the scraper, shaft, and sleeve assembled preparatory to being soldered together.

The invention is exemplified in a disher comprising a hemispherical bowl 10; a handle comprising a metal shank 11, the outer end of which is enlarged and soldered to the outer face of the bowl, and the inner end of which is provided with a grip 12 fixedly secured thereto; a semicircular resilient scraper 13 fitting inside of the bowl, and provided at the outer end with a trunnion 14 which fits and is removably held in a bearing 15 in the bowl; a shaft 16, extending longitudinally of and overlying the shank, having its outer end secured to the inner end of the scraper as hereinafter described, and its inner end removably held in a closed bearing 17 formed in an upward extension 18 of the shank 11; a pinion 19 fixed to shaft 16, adjacent bearing 17; a lever 20 provided with an arcuate rack 21 for rotating the pinion 19 and with an integral pivot-stud 22 removably held in a bearing-socket 23 which is formed in the shank 11 and has its lower end closed; and a spring 24 confined in an annular socket 25 formed in the shank 11 around bearing 23, and applied to retract the lever, pinion, scraper, and its shaft. One terminal of spring 24 extends through a hole 24ª in the shank and its other terminal extends through a notch in the lower face of the lever and engages the inner face of one of said arms of lever. A thumb-piece 20ª is formed on the lever and in the plane of the handle, and is adapted to strike the grip 12 to limit the discharge or working stroke of the scraper. This stroke occurs while the scraper is manually shifted against the force of spring 24. A stop 26 (Fig. 5) is formed on the underside of lever 20 to engage a lug 27 on the shank 11 and arrest the scraper within the bowl. Spring 24 yieldingly holds the lever-stop 26 against lug 27 so that the scraper will be disposed normally in the bowl at the beginning of the discharging or working stroke of the scraper or the end of the movement of the scraper in the spring-pressed direction. The pinion 19 has its teeth interrupted at 19ª to engage the top of the lever 20, and this also serves to limit the movement of the scraper in the spring-pressed direction or during the non-working stroke, and to limit the working stroke of the scraper. This interruption also serves to indicate the correct position of the pinion while it is being placed in mesh with the rack in assembling the device. Lever 21 overlies the shank and is operative laterally between the shaft 16 and the shank.

The scraper 13 is formed of a resilent strip and its inner end is provided with a straight terminal 29 which fits in a horizontal slot 30 cut in the outer end of shaft 16. A sleeve 31 fits over the shaft 16 and is provided in its outer end with a notch 32 through which the curved portion of the scraper extends. In manufacturing the unit which comprises the scraper, shaft, and pinion, the end 29 of the scraper is fitted in the slot 30, and sleeve 31 is slipped over the end 29 of the scraper and slot 30 so the sleeve will confine the scraper terminal 29 in slot 30, and the curved portion of the scraper will interlock with the notch 32, and the sleeve will lock the scraper and shaft together. The outer end of sleeve 31 is then filled with solder. This constitutes a connection between the scraper, sleeve, and shaft, by which the scraper will be interlocked with both the sleeve and the shaft.

Sleeve 31 forms an enlargement on the shaft 16 which fits in an undercut bearing 28 formed in the outer end of shank 11 and in the bowl 10. The inner end of the sleeve is tapered, as at 31ª, to facilitate its longitudinal passage into bearing 28. The undercut open bearing 38 is formed to confine the sleeve 31 against transverse removal and to hold the shaft in the bearing, and has an opening at its top of sufficient width to permit transverse withdrawal and insertion of the shaft 16 which is smaller in diameter than the sleeve. This opening permits the shaft to be inserted transversely into the bearing 28 before its sleeve has been shifted longitudinally into the bearing, while assembling the scraper and shaft unit with the bowl, and permits the shaft to be removed transversely from the bearing after the sleeve 31 has been shifted longitudinally out of the bearing while removing the shaft from its bearing 17 in removing the scraper from the bowl.

The normal working stroke of the scraper is sufficient to permit the scraper 13 to be operated a limited distance outside of the bowl, as shown in Fig. 3, and the stop-means for the lever in the manually operated direction is particularly designed so the scraper will travel outside of the bowl. This insures the discharge of the cream from the bowl by the normal working stroke of the scraper. It also positions the scraper so its outer end can be easily flexed to withdraw the trunnion 14 out of the hole 15 in the bowl while the scraper is at the end of its normal working stroke without bending the scraper sufficiently to distort the scraper permanently. The trunnion 14 may be placed in and removed from its bearing 15, and the outer end of the scraper may be easily deflected over the edge of the bowl from the inside to the outside or vice versa. The scraper and shaft unit may be removed by outward longitudinal movement after the trunnion has been released, until the sleeve 31 has been shifted outwardly of the undercut bearing 28, and the inner end of the shaft has been removed from its bearing 17 and pinion 19 has been disengaged from the lever-rack 21. Then the shaft 16 will pass through the restricted opening at the top of the bearing 28, so that the scraper and shaft unit may be completely separated from the handle.

In assembling the disher, stem 22 of lever 20 is inserted in the bearing 23 with the thumb piece 20ª swung forwardly to a point adjacent the bowl. The lever will then engage the upper terminal of spring 24, and by swinging the lever towards the grip 12 it will wind up the spring and put it under tension. After the lug 26 has passed over the stop 27, the lever will be forced toward the shank and the lever will then be held in the normal position by the pressure of the spring as more fully set forth in Patent No. 1,132,657. The operator will then press the lever 20 into the position shown in Fig. 2. Then the shaft 16 will be transversely inserted through the opening into bearing 28, and shifted longitudinally toward the grip 12, until its inner end is held in bearing 17, while pinion 19 slides into mesh with the teeth of rack 21, and sleeve 31 enters the bearing 28. In this position, the scraper 13 will be outside of the bowl, and its outer end will be sprung over the edge of the bowl to snap the trunnion 14 into hole 15 in the bowl. Upon release of the lever the scraper will be shifted into its normal position by spring 24.

When the scraper is to be removed, the operator will press the lever 20 into position shown in Fig. 2, so that the trunnion 14 can be snapped out of its bearing 15 and over the edge of the bowl. Shaft 16, scraper 13, and pinion 19 will then be moved longitudinally so that sleeve 31 will clear bearing 28 and the inner end of the shaft will pass out of its bearing 17, when the shaft and scraper unit can be moved transversely away from the shank.

This exemplifies a construction in which it is not necessary to provide a movable or adjustable stop which must be operated in order to make it possible to remove the scraper from the bowl and its shaft from its bearings, one of which is open, because the normal working stroke of the shaft and scraper will bring the scraper into a position outside of the bowl, so that by manipulation of the trunnion 14 out of its bearing, the unit may be separated from the handle.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a disher, the combination of a bowl, a handle on the bowl, a resilient scraper working in the bowl and provided at one of its ends with an extension, a scraper shaft having a longitudinal slot in one end thereof in which the extension fits, a lever for rotating the shaft, and a sleeve fixed on said one end of the shaft, positioned so that it surrounds the extension, and having means interlocking with a portion of the scraper, so that it is locked against rotation relatively to the shaft.

2. In a disher, the combination of a bowl, a handle on the bowl, a resilient scraper working in the bowl and provided with a trunnion at its outer end and an extension at the inner end thereof, a bearing in the bowl for the trunnion, a removable shaft for the scraper having a longitudinal slot in one end thereof in which the extension fits, a lever pivoted to the handle and provided with a rack, a pinion fixed to the shaft and engaging said rack, and a sleeve on said one end of the shaft, fitting over said slot and around said extension, and having a notch interlocked with a portion of the scraper so that it is locked against rotation relatively to the shaft.

Signed at Chicago, Illinois, this 21st day of March, 1930.

JOHN W. COX.